June 30, 1959  R. M. MANSFIELD  2,892,246
METHOD AND APPARATUS FOR FORMING A SELF-ALIGNING BEARING
Filed Oct. 16, 1956  3 Sheets-Sheet 1
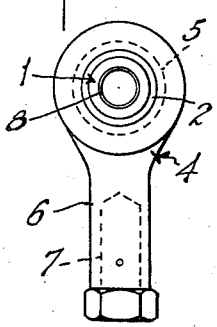
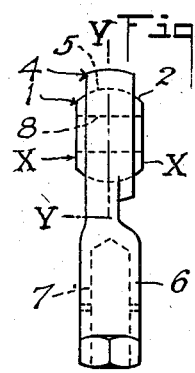
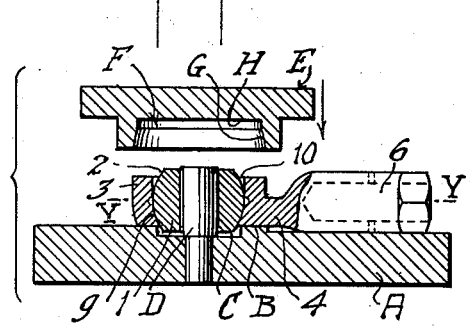
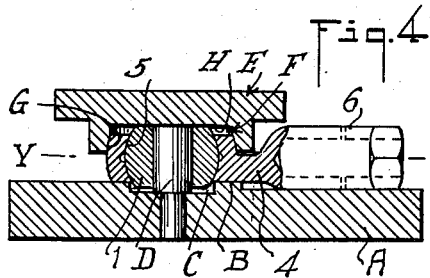
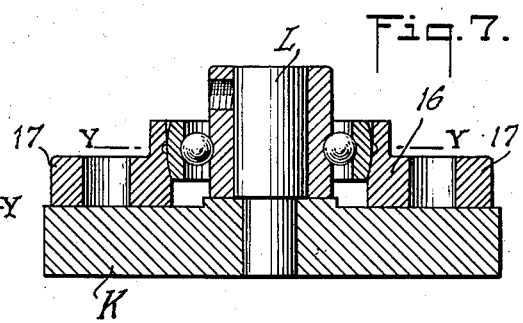
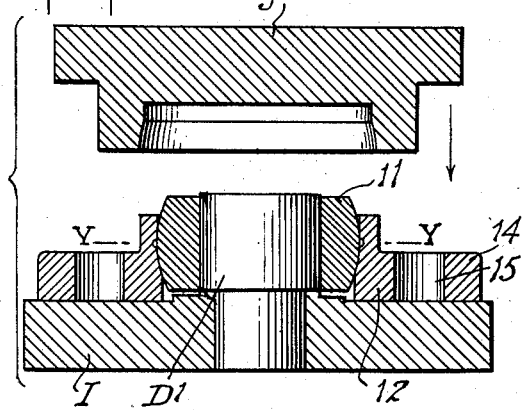
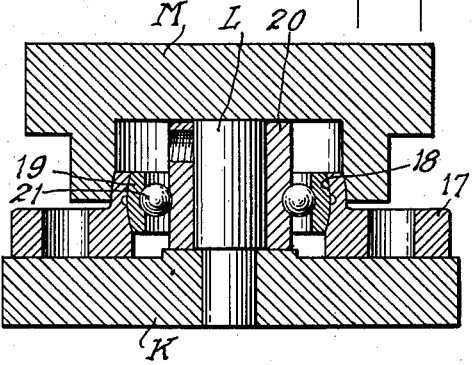
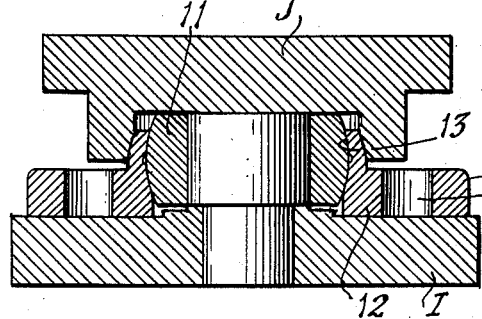
INVENTOR.
Roland M. Mansfield,
BY
Harry B. Cook,
ATTORNEY

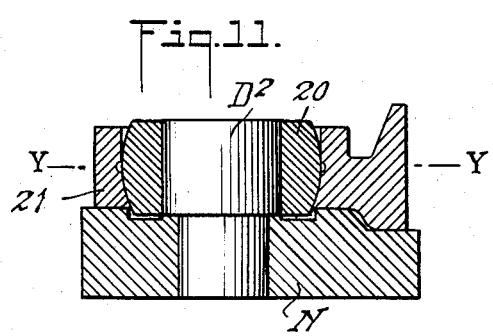
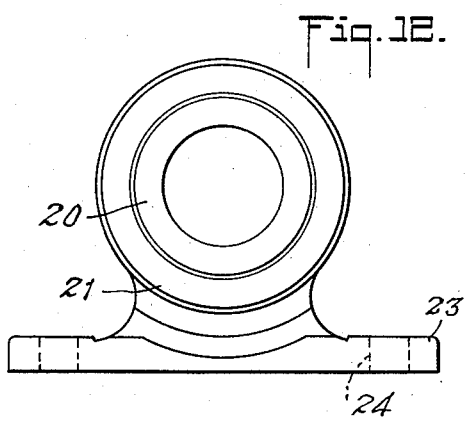
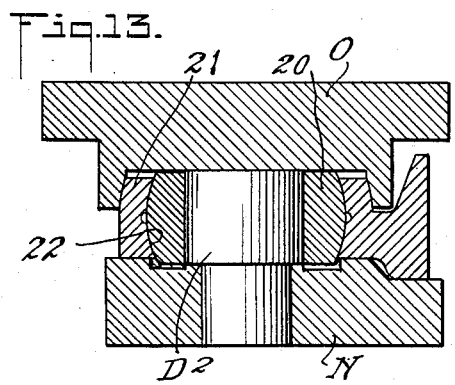
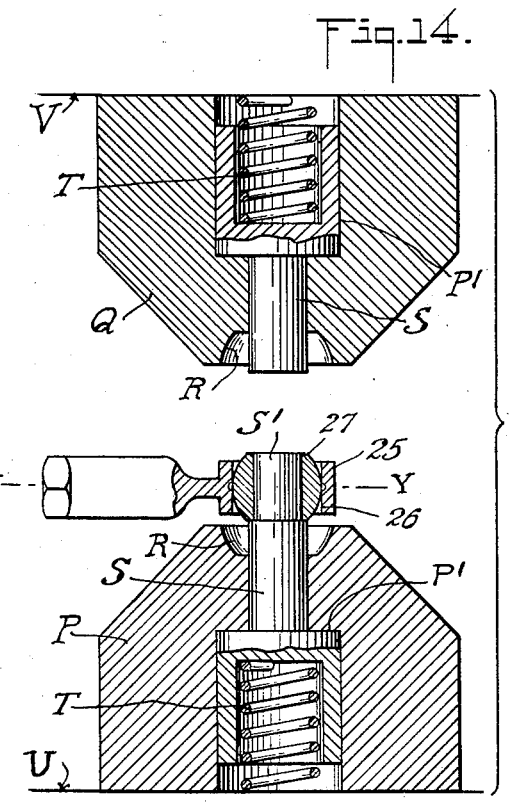
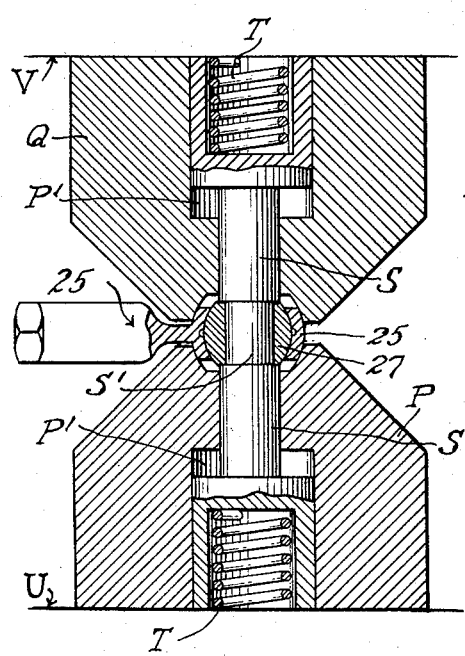

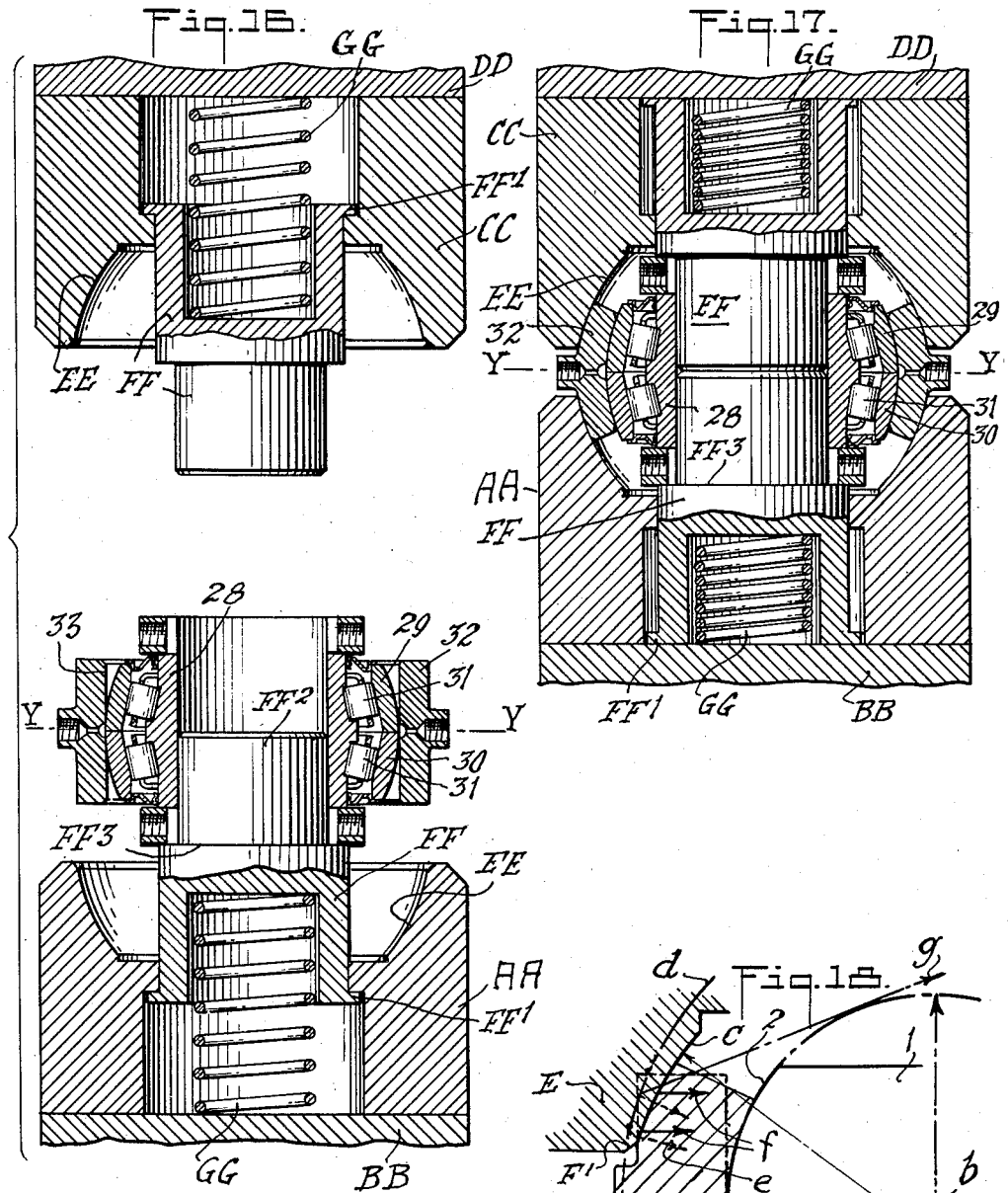

United States Patent Office
2,892,246
Patented June 30, 1959

2,892,246

METHOD AND APPARATUS FOR FORMING A SELF-ALIGNING BEARING

Roland M. Mansfield, Southport, Conn., assignor to Tek Bearing Company, Bridgeport, Conn., a corporation of Connecticut Application October 16, 1956, Serial No. 616,195

4 Claims. (Cl. 29—149.5)

This invention relates to self-aligning bearings of the type which embodies an inner member, having a segmentally spherical outer surface and an outer member having a segmentally spherical socket in which said inner member is disposed. The inner members of the bearing elements comprise either a ball element mounted on a shaft, or the outer race ring of a ball or roller bearing, while the outer member comprises a housing in which the inner member is mounted for free relative rotation.

A primary object of the invention is to provide a novel and improved method and apparatus for making a self-aligning bearing of the character described in which the inner member is secured within the socket of the outer member with the walls of the socket in conforming relatively slidable relation to the spherical surface of the inner member, in one continuous operation as distinguished, for example, from the bearing and method described in Patents Nos. 2,626,841 and 2,724,172 dated January 27, 1953, and November 22, 1955, respectively, in which the ductile walls of the outer member are compressed or coined into intimate and direct contact with the spherical surface of the inner member to produce a binding action therebetween in one operation, and then in a second operation the outer member is rolled or compressed by radially inwardly applied pressure to relieve some of the pressure of the walls of the outer member on the surface of the inner member and thereby permit smooth relative rotation of the inner and outer members.

Another object of the invention is to provide such a method and apparatus wherein the inner member has a coaxial bore and the segmentally spherical socket of the outer member is open at both ends and the walls of said outer member in at least the portion at one end of said socket are deformed from an initially spaced and free relation to the outer spherical surface of the inner member into conforming relatively slidable relation to said surface in one and the same operation and thereby connect the inner member and outer member for free relative rotation by placing the inner and outer members on a die member with a post extending through said bore in the inner member and thereby to hold said inner and outer members against bodily movement, and forcibly moving a second die member with a segmentally spherical die surface coaxially and in overlying contact with said end portion of the outer member and toward the inner member while so holding said inner and outer members, and stopping said movement at a pre-determined point by abutment of said post with the second die member.

A further object is to provide such method and apparatus wherein at least said end portion of the walls of said socket are deformed and pressed from an initially spaced and free relation to the outer surface of the inner bearing member towards said outer surface simultaneously radially and tangentially of said outer surface into conforming relatively slidable relation to said outer surface.

Other objects, advantages and results of the invention will be brought out by the following description in conjunction with the accompanying drawings in which—

Figure 1 is a front elevational view of one type of self-aligning bearing that is commonly used for the pivotal connection of a rod to a shaft;

Figure 2 is a side elevational view thereof;

Figure 3 is a central vertical sectional view through the inner and outer parts of the bearing in partially assembled relation in an apparatus for pressing the walls of the outer member around the inner member and illustrating one step in the method;

Figure 4 is a similar view showing the next successive step in the method;

Figure 5 is a view similar to Figure 3 showing the flange bearing embodying the invention;

Figure 6 is a view similar to Figure 4 of the flange bearing and apparatus shown in Figure 5;

Figure 7 is a view similar to Figure 5 of another type of ball bearing with a portion of the forming apparatus omitted;

Figure 8 is a view similar to Figure 4 of the bearing shown in Figure 7 and the apparatus for forming it;

Figure 9 is a front elevational view of the flange bearing illustrated in Figure 6;

Figure 10 is a similar view of the flange ball bearing illustrated in Figure 8;

Figure 11 is a view like Figure 3 illustrating a step in the formation of a type of pillow block bearing and with a portion of the apparatus omitted;

Figure 12 is a front elevational view of the completed pillow block bearing that is shown in Figure 11;

Figure 13 is a view similar to Figure 4 illustrating the bearing and apparatus shown in Figures 11 and 12;

Figure 14 is a view similar to Figure 4 showing another form of apparatus for producing the bearing and illustrating one step in the method of assembling the inner and outer members of the bearing;

Figure 15 is a view like Figure 14 but showing the next step in the method of pressing the outer bearing member around the inner bearing member;

Figure 16 is a view similar to Figure 14 showing apparatus for making a self-aligning roller or ball bearing in which the outer race member is mounted in the housing or outer housing member of the self-aligning bearing and illustrating one step in the method of making the bearing;

Figure 17 is a similar view illustrating the next step in the formation of the bearing; and Figure 18 is a diagrammatic view illustrating the curvature of the walls of one die member and the direction of movement of the ductile metal of the outer member during the deforming and pressing operation.

Specifically describing the embodiment of the invention illustrated in Figures 1-4 inclusive, the self-aligning bearing is shown as including an inner bearing member 1 that has a segmentally spherical outer surface 2 whose ends X, X lie in parallel chordal planes at opposite sides of a diametral plane Y—Y of said surface, said inner member being non-separably connected to the outer bearing member 4 which has a segmentally spherical socket whose ends open at both ends at opposite sides of said plane Y—Y whose walls are formed of relatively ductile metal and in relatively slidable relation to the outer spherical surface of the inner member. The outer bearing member has an extension 6 provided with a socket 7 for connection, for example to one end of a rod, while the inner bearing member has a coaxial hole 8 passing through said chordal end planes to receive another rod or shaft.

In accordance with the invention, the bearing members 1 and 4 may be formed of solid metal or of sintered iron, the ball is heat treated and ground according to known metals to provide a hard and smooth spherical surface, while the socket walls of the outer member are relatively ductile.

The outer member is made initially with an annular body having a cylindrical hole which is of a diameter to provide for free relative sliding of said inner member therein, and preferably with the end portions of the wall of said body of uniform thickness at opposite sides of said plane and at least one end portion of the surface of the hole at one side of said plane Y—Y preformed to conform substantially to the spherical surface 2 of the inner member as indicated at 9 and with the other end portion of the wall of said hole at the other side of said plane in freely spaced relation to the spherical surface of the inner member as indicated at 10. The outer member is laid upon a die plate A which has a seating surface B for the end of the outer member, said seating surface being shaped in such conformity to the shape of said outer member as to provide a firm seat for the latter, said seating surface also being provided with a recess C of a diameter slightly greater than the diameter of the end of the socket to provide a clearance for the inner member 1 when the latter is placed in contact with the preformed portion 9 of the socket wall as shown in Figure 3. A post D projects rigidly upward from the die plate A and has a portion to nicely slidably fit into the hole 8 of the inner member 1 for holding said inner member against lateral movement on the die plate, the outer end of the post projecting slightly above the corresponding end chordal plane of the inner member 1.

Cooperating with the die plate A is a die block E in which is provided a die cavity F the outer end of which is of a diameter greater than the outer diameter of the portion of the walls of the outer bearing member that are to be pressed into relatively slidable contact with the inner member. The inner side surface G of the die cavity F is segmentally spherical while the surface H of the die cavity is flat and parallel to the upper end of the post D so as to abut the post for limiting movement of the die block E toward the die block A.

The side surface G of the die cavity is so shaped and the movement of the die block E toward the die plate, are so related that when the inner and outer bearing members are arranged on the die plate as shown in Figure 3 and the die block E is forced in the direction of the arrow into contact with the outer bearing member 4, the portions of the walls of the socket that are initially spaced and free from the inner member as indicated at 10 will be deformed and pressed into conforming but relatively slidable relation to the spherical surface of the inner member and thereby separably connect the inner and outer members for free relative rotation. The extent of relative movement of the die block and die plate, and the curvature and diameter of the side surface G of the die cavity will vary depending upon the diameter of the bearing being formed.

Preferably, the open end or mouth of the die cavity F is of a diameter at least equal to the diameter of the outer edge of the annular wall of the outer bearing member before deformation of said wall and has a starting chamfer F¹. The segmentally spherical side surface G of the die cavity is formed with a radius such that its outer end meets the edge of the said open end or mouth of the die cavity, and so that when the die members are closed the center $a$ of said spherical surface G is offset from the center $b$ of the outer spherical surface 2 of the inner bearing member outwardly of the die cavity F, as best shown in Figure 18, so that when the die members are moved together the metal in the annular wall of the outer member between the end of said wall and the diametral plane Y—Y that is perpendicular to the axis of the said wall, is deformed and pressed toward the spherical surface 2 of the inner member simultaneously radially and tangentially of the surface 2 from the initial position shown in dotted lines to the cross-hatched position as shown in Figure 18. During the deforming operation, the annular wall appears to gradually decrease in thickness from said diametral plane Y—Y to the end of the wall as best shown in Figures 17 and 18. The centers of the die surfaces may be offset from the centers of the spherical surfaces of the inner members various distances when the dies are closed, depending upon the sizes of the bearings, for example, distances of the order of .060 to .540 inch for annular walls having outer diameters of from 1.50 to 2.75 inches.

In Figure 18 the heavy curved line $c$ represents the curvature of the die surface G while for comparison purposes the lighter double dot and dash line curve $d$ is shown concentric with the surface 2 of the inner member but of the same radius as the curve $c$. The dotted arrows $e$ in Figure 18 are radial to the center $b$ of the curvature of the spherical surface 2 of the inner member, while the heavy solid line arrows $f$ indicate directions that are composites of said radial directions and directions tangential to the curvature of the surface 2 of the inner member that are indicated by the dot and dash line arrow $g$.

The closing movement of the die members is continued until the bottom surface H of the die cavity abuts the end of the post D at which time the inner surface of the socket 5 in the outer member 4 will have pressed into conforming relatively slidable relation to the outer spherical surface of the inner member so as to non-separably connect the inner and outer members for free relative rotation with the required operating clearances but without excessive lost motion between said members.

Thereupon the die plate and die block are separated and the completed bearing member is slipped off the post D, and it will be observed that the said relative rotation of the inner member and outer member will permit the inner and outer members to adjust themselves and properly operate in various angular relations to each other and thereby permit a shaft in the hole 8 of the inner member and a rod in the socket 7 of the outer member to be properly aligned with interconnected parts.

Figures 5 and 6 show the embodiment of the invention in a self-aligning pillow block bearing which comprises an inner member 11 that may be identical with the member 1, and an outer member 12 that has a segmentally spherical socket 13 identical with the socket 5 but, instead of having an extension 6, is provided with oppositely extending flanges 14 having openings 15 to receive bolts or screws for attaching the bearing to, for example, a machine frame. The die plate I is essentially the same as the die plate A, except that its top surface is shaped to provide a seat for the flanges 14, and the die block J is essentially the same as the die block E. Figure 5 shows the positions of the parts of the bearing and the die plate and die block like the positions of the corresponding parts in Figure 3, while Figure 6 shows the bearing completed after the deforming or pressing operation on the outer member. Figure 9 shows the bearing in front elevation after removal thereof from the forming apparatus.

Figures 7 and 8 show the invention embodied in a ball bearing pillow block which comprises an outer member or housing 16 having apertured flanges 17 like the flanges 14 and also having a segmentally spherical socket 18 in which is relatively rotatably mounted the outer race member 19 of a ball bearing which also includes the inner race member 20 and balls 21 between the two race members as usual. The apparatus for forming this type of bearing may be essentially the same as that shown in Figures 5 and 6 and includes a die plate K on which the outer member 16 is seated and from which projects a positioning post L that nicely slidably fits the opening through the inner race member 20, a die block M like the die block J cooperating with the die plate K in the same manner as hereinbefore described. In Figure 7 the die block M has been omitted and the parts of the bearing are shown as assembled on the die plate prior to the connection of the inner and outer bearing members, while Figure 8 shows the bearing members completely and non-separably assembled at the end of the metal deforming or pressing operation on the outer member. The completed bearing upon removal from the forming apparatus appears in front elevation as shown in Figure 10.

Figure 12 shows another type of pillow block bearing which includes an inner member 20 that may be identical with the inner member 1, and an outer member 21 which has a segmentally spherical socket 22 in which the inner member is freely rotatable, the outer member also having flanges 23 provided with openings 24 for bolts or screws to secure the pillow block on a machine frame. The pillow block may be formed with apparatus of the same general nature as that hereinbefore described including a die plate N like the other die plates except that its upper surface is shaped to conform to the shape of one end of the outer member 21 of the pillow block; a die block O like the other die blocks cooperating with the die plate N for deforming and pressing the outer member around the inner member.

Figures 14 and 15 show another type of apparatus embodying the invention and for simultaneously pressing and deforming both end portions of the walls of the socket of the outer bearing member into relatively slidable relation to the spherical surface of the inner member. Here the outer member 25 is initially formed with a straight hole or bore 26 therethrough of a diameter slightly greater than the diameter of the outer spherical surface of the inner member 27 such that the two members have a relatively slidable relation. The cooperating die members P and Q have identical die cavities R the curved side walls of which are formed in the same manner in which the side walls of the die cavity G are formed, and each of the die members has a post S slidable therein coaxially with the corresponding die cavity with one end normally projecting out of the cavity. Obviously one die member will be mounted on, for example, a press bed U and the other will be mounted on a reciprocating press head V, and the springs T are provided between the posts and the corresponding press bed or head for holding the posts in said normal position, movement of the posts under the influence of the springs being limited by abutment of shoulders on the posts with the ends of recesses P' in which the posts are slidable in the die members. One of the posts, preferably the bottom post, has a reduced extension S' of a diameter to nicely slidably fit the hole in the inner bearing member 27, the reduced portion providing a shoulder upon which seats the inner member as shown in Figure 14.

The bearing is made by first assembling the inner and outer members as shown in Figure 14 and then causing the die members to move together so that the curved side walls of the die cavities press the walls of the socket in the outer member into relatively slidable relation to the outer spherical surface of the inner member as shown in Figure 15, the movement of the die members toward each other being limited by abutment of the outer end of one post with the juxtaposed end of the other post and the simultaneous abutment of the other ends of the posts with their respective press head or bed.

The same method and in general similar apparatus may also be utilized for making a double race tapered roller bearing as shown in Figures 16 and 17. Here one die member AA is mounted on a press bed BB while the other die member CC is mounted on the reciprocating press head DD, and each die member has a die cavity EE the curved side surface of which is formed in the same manner as the side surface G of Figures 1–4 inclusive. Each die member has a post FF slidably mounted therein and normally influenced by a spring GG to project one end of the post out of the cavity, such outward movement being limited by engagement of a flange $FF^1$ with the bottom wall of the recess in which the post is slidable. The post of the lower die member has a reduced end portion $FF^2$ of a diameter to nicely slidably fit into the bore of the inner race member 28 of the tapered roller bearing, the post having a shoulder $FF^3$ at the inner end of said reduced portion that forms a seat for said inner race ring. The tapered roller bearing includes an outer race formed of two complemental sections 29 and 30 and a complement of rollers 31 is interposed between the inner race ring 28 and each of said outer race sections. The housing 32 of the self-aligning bearing is initially formed with a straight bore 33 (like the bore 26) of such diameter as to receive the double outer race comprising the two sections 29 and 30, in close relatively slidable relation.

The tapered roller bearing and the housing are connected together by first assembling the inner race ring, the rollers and the outer race sections 29 and 30 on the reduced portion $FF^2$ of the lower post FF as shown in Figure 16, and the housing 32 is slipped over the outer race member comprising the two sections 29 and 30 and then the die members are forced together so that the curved surfaces of the die cavities EE simultaneously engage respective end portions of the walls of the housing and press them simultaneously into conforming relatively slidable relation to the outer race sections as shown in Figure 17, the movement of the die members toward each other being limited by abutment of the ends of the posts with each other and by abutment of the posts with the respective press bed and head.

The invention also contemplates the utilization of means for controlling the pressure applied to the die members during the deforming operation of the outer bearing member, instead of utilizing the positive stops hereinbefore specifically described, namely the abutment of the bottom of the recess F with the post D and the abutment of the juxtaposed ends of the posts S and posts FF. In other words, an automatic relief valve may be provided on either the hydraulic pump or the hydraulic pressure pipe line which supplies the hydraulic pressure to the ram for operating the die members so that during the operation of deforming the outer bearing member, the hydraulic pressure will be instantaneously released from the die members when a predetermined maximum pressure is reached. Thus the deforming operation will be automatically stopped when the spherical surface of the socket in the outer bearing member is pressed into the desired conforming and relatively slidable relation to the spherical surface of the inner bearing member. The automatic relief valve may be regulated to relieve the hydraulic pressure at any predetermined maximum which will of course vary depending upon the size of the housing or outer bearing member and the nature of the metal of which said housing is formed.

It will be understood by those skilled in the art that the preformed portion of the socket of the outer member may be made in any suitable manner as by machining or by die stamping, and of course, if desired, the flange bearings like those of Figures 5–10 inclusive might also be formed by die stamping operations.

It has been found that the conformity of the contacting surfaces of the outer and inner bearing members made according to the invention is markedly superior to that achieved in other bearings of this type made by other methods, and provides substantially more area of slidable contact between the inner and outer members, all of which in turn ensures longer life for the bearings. The method according to the invention is simple and permits the desired conforming relatively slidable relation of the inner and outer members to be achieved in a single metal deforming or coining operation.

It will be noted that in all forms of the invention, the inner bearing member is initially arranged in an annular body of the outer bearing member which has an inner cylindrical surface of a diameter substantially the same as that of the spherical surface of the inner member, and that at least one end portion of said annular body is pressed or deformed inwardly into conforming and relatively slidable relation to said outer surface of the inner member. In the form of the invention shown in Figures 1–13 inclusive a segmentally spherical surface is preformed at one end of said cylindrical surface to conform to the outer surface of the inner member, while in the form of the invention shown in the other figures, said cylindrical surface initially extends entirely through said annular body and both end portions of the annular body are deformed and pressed inwardly into conforming relatively slidable relation to the surface of the inner member.

While I have shown the invention in connection with several types of bearings and have illustrated and described several different methods and apparatus invloving the invention, it should be understood that this is primarily for the purpose of explaining the principles of the invention and that the invention may be utilized for making other bearings and that many modifications and changes in the apparatus and in the steps of the method may be made within the spirit and scope of the invention.

What I claim is:

1. Apparatus for making a self-aligning bearing having an inner bearing member with a segmentally spherical outer surface whose ends lie in parallel chordal planes at opposite sides of a diametral plane of said surface and with a coaxial hole, and a relatively ductile outer bearing member having a socket for said inner member initially in the form of an annular body having a cylindrical end portion with the hole in at least said end portions of a diameter to provide for sliding of said inner member therein with operating clearance, said apparatus including cooperative die members movable toward and from each other, at least one of said die members having a die cavity open at one end with a spherical die surface whose center is offset outwardly of the die cavity from the center of the spherical outer surface of the inner bearing member when the die members are closed and whose radius is such that the open end of the die surface is of a diameter at least equal to the outer diameter of said cylindrical end of the annular body, the other die member having one end to abuttingly conform to the other end of said annular body, and a post projecting perpendicularly from said end of the second-mentioned die member to nicely slidably fit into said hole of the inner bearing member.

2. Apparatus as defined in claim 1 wherein said post is of a length such that its outer end will be abutted by a part in the die cavity of the other die member to limit the movement of said die members toward each other.

3. Apparatus for making a self-aligning bearing having an inner bearing member with a segmentally spherical outer surface whose ends lie in parallel chordal planes at opposite sides of a diametral plane of said surface and with a coaxial hole, and a relatively ductile outer bearing member having a socket for said inner member initially in the form of an annular body having a cylindrical end portion with the hole in at least said end portion initially of a diameter to provide for sliding of said inner member therein with operating clearance, said apparatus including cooperative die members movable toward and from each other, at least one of said die members having a die cavity with a spherical die surface opening through one end thereof and whose open end is of a diameter at least equal to the outer diameter of said cylindrical end of the annular body, the other die member having one end to abuttingly conform to the other end of said annular body, and a post projecting perpendicularly from said end of the second-mentioned member to nicely slidably fit into said hole of the inner bearing member, said post having a shoulder rest for supporting said inner bearing member in predetermined relation to said annular body, said post being of a length such that its outer end will be abutted by a part in the die cavity of the other die member to limit the movement of said die members toward each other.

4. The method of making a self-aligning bearing having an inner bearing member with a segmentally spherical outer surface whose ends lie in parallel chordal planes at opposite sides of a diametral plane of said surface and with a coaxial bore, and a relatively ductile outer bearing member having an annular body with a segmentally spherical socket for said inner member, said method including the steps of arranging said inner member in a hole in an annular body with the ends of said body opening at opposite sides of said plane, the surface of which hole at one end portion of said body is cylindrical and of a diameter to provide for free relative sliding of said inner member and said wall and initially freely spaced from said outer surface from said plane to one end of said hole, holding said inner and outer members against bodily movement on a die having a post extending through said bore in the inner member, deforming and pressing said portion of the outer member by forcibly moving a second die with a segmentally spherical die surface coaxially and in overlying contact with said end portion of the annular body and toward the inner member while so holding said inner and outer members, and stopping said movement at a pre-determined point by abutment of said post with the second die member.

References Cited in the file of this patent

UNITED STATES PATENTS

| 321,822 | Kind | July 7, 1885 |
| 608,950 | Brookes et al. | Aug. 9, 1898 |
| 1,693,748 | Fiegel et al. | Dec. 4, 1928 |
| 2,462,138 | Spangenberg | Feb. 22, 1949 |
| 2,669,491 | Haller | Feb. 16, 1954 |

FOREIGN PATENTS

| 1,042,216 | France | June 3, 1953 |